O. G. DIEFENDORF.
COFFEE FILTER.
APPLICATION FILED MAY 6, 1919.
1,335,048.
Patented Mar. 30, 1920.
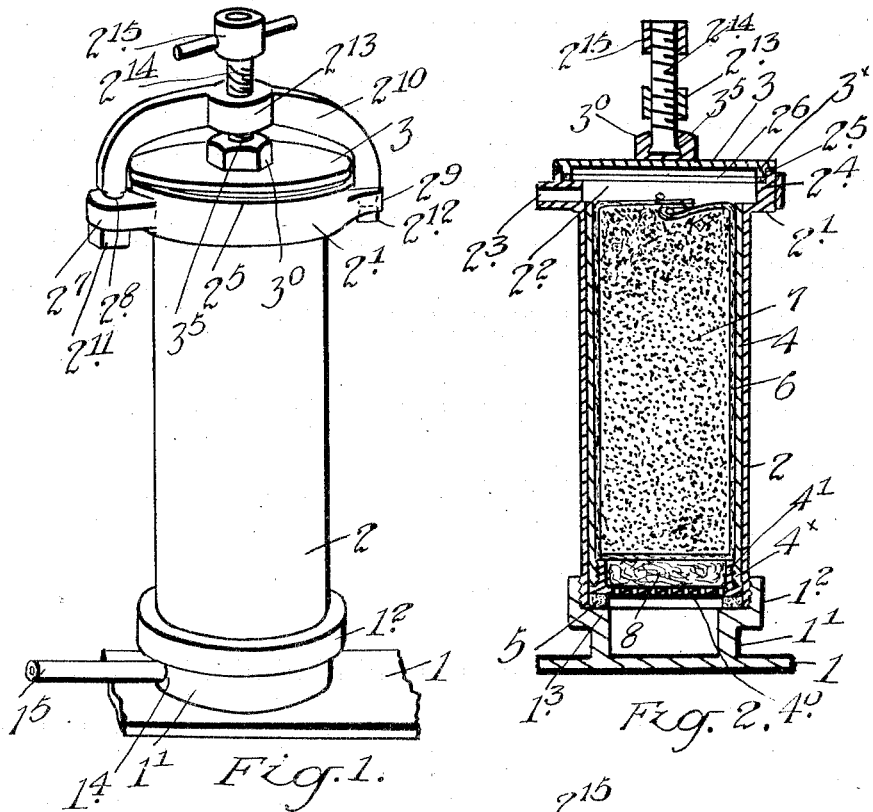
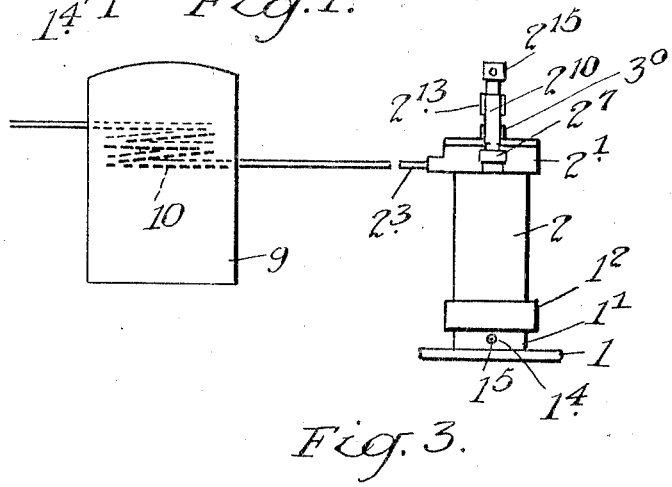
Fig. 3.
INVENTOR.
ORVIS G. DIEFENDORF

UNITED STATES PATENT OFFICE.

ORVIS G. DIEFENDORF, OF WATERTOWN, NEW YORK.

COFFEE-FILTER.

1,335,048.  Specification of Letters Patent.  Patented Mar. 30, 1920.

Application filed May 6, 1919. Serial No. 295,090.

*To all whom it may concern:*

Be it known that I, ORVIS G. DIEFENDORF, of the city of Watertown, in the State of New York, United States of America, have invented certain new and useful Improvements in Coffee-Filters, of which the following is the specification.

My invention relates to improvements in coffee filters and the object of the invention is to devise a filter particularly adaptable for restaurants and hotels and all public places where coffee is served and which will prevent all rile and foreign matter from passing with the liquid from the ground coffee so as to insure that the coffee when made will be absolutely clear and it consists of the arrangement and construction of parts as hereinafter more particularly explained.

Figure 1, is a perspective view of my filter.

Fig. 2, is a vertical section through Fig. 1.

Fig. 3, is a diagrammatic view showing my filter connected to a water heating coil located in a heater.

In the drawings like characters of reference indicate corresponding parts in the various figures.

1 indicates a suitable base from which extends an annular portion $1'$ provided at its upper end with an enlargement $1^2$ forming an internal shoulder $1^3$. $1^4$ indicates an orifice formed in the side of the portion $1'$ and to which is connected a discharge pipe $1^5$. 2 indicates a cylindrical casing secured at its lower end in the portion $1^2$ and provided at its upper end with an enlargement $2'$ forming a water entrance chamber $2^2$. $2^3$ indicates a water supply pipe which extends through the wall of the chamber $2'$ to supply water thereto. $2^4$ indicates a shoulder formed at the top of the chamber $2^2$ around which extends an annular flange $2^5$. $2^6$ indicates an annular gasket which rests upon the shoulder $2^4$. 3 indicates a cover provided with a flange $3^\times$ resting upon the top of the gasket $2^6$. $3^0$ indicates a nut boss formed in the center of the cover 3. $2^7$ indicates a lug, which extends outwardly from the outer casing and is provided with an orifice $2^8$. $2^9$ indicates a lug, which extends outwardly from the opposite side of the casing and forms a stop. $2^{10}$ indicates a bridging member, which is pivoted at one end in the lug $2^7$, being secured in position by a nut $2^{11}$. The opposite end is provided with a turned portion $2^{12}$ extending under the lug $2^9$. The bridging member $2^{10}$ is provided centrally with an internally threaded enlargement $2^{13}$. $2^{14}$ indicates a screw spindle which extends through the internally threaded enlargement $2^{13}$ and is provided at its upper end with a turn handle $2^{15}$ and is turnably connected at its lower end in a recess $3^5$ formed in the nut boss $3^0$. By this means when the cover is swung over the top of the outer casing 2 and the free end of the member $2^{12}$ is in engagement with the lug $2^9$ the cover may be clamped in position by the screw $2^{14}$ so as to render the top of the casing absolutely water tight.

4 indicates an internal cylinder which fits the outer cylinder 2 and is provided at its lower end with an internally threaded portion $4^\times$. $4^0$ indicates a perforated cap provided with an annular externally threaded flange $4'$ which is screwed into engagement with the internal thread $4^\times$. 5 indicates an annular gasket resting upon the shoulder $1^3$ and on which the lower end of the inner cylinder 4 and cap $4^0$ rest.

6 indicates a fabric bag which contains the coffee 7, and is so formed as to feed into the interior of the inner cylinder 4. 8 indicates a suitable filtering material which fills the space directly below the bag 6 formed by the perforated cap $4^0$. 9 indicates a heater of any suitable structure in which is located a water heating coil 10, one end of the coil being connected to the water supply inlet $2^3$ of my coffee filter and the other end of the coil 10 being connected to the water supply connected to the ordinary mains of the water supply system. The water is, therefore, fed into the coil under city pressure and as it passes through the coil is heated and passes through the water supply orifice $2^3$ into the top of the outer casing 4, that is, into that portion of the casing forming the water chamber $2^2$. It is then forced by pressure through the coffee and from thence through the filtering material 8, which prevents any sediment, rile or other foreign substance from being carried off by the fluid from the ground coffee 7. The fluid coffee then passes into the chamber formed by the casting $1'$ and then through the outlet pipe $1^5$ to a suitable receptacle.

From this description it will be seen that I have devised a very simple device which is particularly adaptable for use in restaurants, hotels and other public places, which will supply coffee which will be absolutely pure and free from foreign substance resulting in the fluid coffee being of a clear amber color.

What I claim as my invention is—

A coffee filter comprising an outer casing having a permanent closure at its lower end forming an annular internal shoulder and having a fluid outlet, a removable closure for the upper end of the casing, means for feeding water into the upper end of the casing under pressure, an inner cylinder adapted to hold the ground coffee supply fitting the casing and having a perforated lower end resting upon the internal shoulder of the outer casing, filtering material supported upon the perforated lower end of the inner cylinder, and fabric means for separating the coffee from the filtering material.

ORVIS G. DIEFENDORF.

Witnesses:
D. C. HASKIN,
SILAS L. BROTHERS.